United States Patent [19]
Ogasawara et al.

[11] Patent Number: 6,066,352
[45] Date of Patent: May 23, 2000

[54] COMPOSITIONS CONTAINING NOVEL PROTEIN COMPLEXES

[75] Inventors: Masashi Ogasawara; Kazuhiro Yamamoto; Makoto Watanabe, all of Ibaraki, Japan

[73] Assignee: Kyowa Hakko Kogyo Co., Ltd., Tokyo, Japan

[21] Appl. No.: 09/078,571

[22] Filed: May 14, 1998

[30] Foreign Application Priority Data

Nov. 4, 1997 [JP] Japan ................................. 9-301522
Nov. 28, 1997 [JP] Japan ................................. 9-328184

[51] Int. Cl.⁷ .................................................. A21D 10/00
[52] U.S. Cl. ............................ 426/549; 426/94; 426/601; 426/602; 426/604; 426/656
[58] Field of Search ............................. 426/94, 549, 656, 426/601, 602, 604

[56] References Cited

U.S. PATENT DOCUMENTS 4,115,313  9/1978  Lyon et al. ................................. 426/62

FOREIGN PATENT DOCUMENTS

| | | |
|---|---|---|
| 134 658 | 3/1985 | European Pat. Off. . |
| 523 238 | 1/1993 | European Pat. Off. . |
| 61-234733 | 10/1986 | Japan . |
| 62-104536 | 5/1987 | Japan . |
| 62-224265 | 3/1988 | Japan . |
| 63-233761 | 9/1988 | Japan . |
| 1-50720 | 10/1989 | Japan . |
| 3-108450 | 7/1991 | Japan . |
| 4-169155 | 6/1992 | Japan . |
| 5-236896 | 9/1993 | Japan . |
| 6-18626 | 3/1994 | Japan . |
| 6-54650 | 3/1994 | Japan . |
| 7-136496 | 5/1995 | Japan . |
| 9-135658 | 5/1997 | Japan . |
| 84-039607 | 1/1984 | United Kingdom . |
| 86-315970 | 10/1986 | United Kingdom . |
| 90-266528 | 11/1989 | United Kingdom . |
| 93-080319 | 2/1993 | United Kingdom . |
| 95-30341 | 11/1995 | WIPO . |

OTHER PUBLICATIONS

J. Agric. Food Chem., vol. 41, No. 8, 1993, pp. 1287–1291.
Fisheries Science, vol. 61, No. 2, 1995, pp. 373–374.
J. Agric. Food Chem., 30, 481–486 (1982).
J. Agric. Food Chem., 41, 540–543 (1993).

*Primary Examiner*—Lien Tran
*Attorney, Agent, or Firm*—Fitzpatrick, Cella, Harper & Scinto

[57] ABSTRACT

A complex of a protein with a saponin or bile acid, an emulsifier comprising the complex, an emulsified composition comprising the complex, a process for preparing an emulsified composition which comprises mixing the complex, a dough improver comprising the complex, a dough comprising the complex, bread prepared by baking up the dough, and a process for preparing bread, which comprises baking up the dough.

16 Claims, No Drawings

US 6,066,352

COMPOSITIONS CONTAINING NOVEL PROTEIN COMPLEXES

BACKGROUND OF THE INVENTION

1. Field of the Invention

This invention relates to protein complexes with a saponin or a bile acid which are useful as emulsifiers for foods, pharmaceuticals, cosmetics and the like or bread dough improvers.

2. Brief Description of the Background Art

Proteins have an amphiphilic structure equipped with both hydrophilic and hydrophobic regions in one molecule and have an emulsifying action. In addition, proteins are not only of high nutritive value as foods but also have functional properties such as gel forming property and water retaining property. Therefore, they are distinguished from low molecular weight surfactants. Particularly, proteins, such as casein, gelatin and albumin, have conventionally been used as an emulsifier for foods or pharmaceuticals.

However, generally, proteins have a high molecular weight and a complex molecular structure. Therefore, since they are different from low molecular weight surfactants, they cannot be oriented easily on an interface.

As a process for imparting an emulsifying property to proteins by changing their structure to cause orientation on an interface, known are a process for introducing a fatty acid into a protein [J. Agric. Food Chem., 30:481–486 (1982)], a process for introducing lecithin into a protein (JP-B-1-50720, JP-A-5-236896 and JP-B-6-18626; the terms "JP-A" and "JP-B" as used herein mean an "examined Japanese patent publication" and an "unexamined published Japanese patent application", respectively), a process for introducing lysolecithin into a protein (JP-A-6-54650), a process for introducing a polysaccharide into a protein [J. Agric. Food Chem., 41:540–543 (1993)], a process for producing mixture of a partially decomposed product of a grain protein and a saponin (JP-A-4-169155) and the like.

However, emulsifier containing as a base material a protein prepared in accordance with the above-described processes are not always satisfactory from the viewpoints of storage stability under acid conditions or in the presence of a salt, and emulsifying stability such as stability to heating.

Both saponin and bile acid are known as natural surfactants. However, when they are used alone, materials emulsified by them are limited because of their high hydrophilic property. In addition, since a saponin and a bile acid have tastes and odors peculiar to them, they are not desirable as food surfactants.

Accordingly, there is a demand for the development of an emulsifier, particularly a food emulsifier, which has excellent emulsion stability and uses a protein as a base material.

On the other hand, a bread preparing process by using a machine such as a divider and an automatic encrusting machine is accompanied with the drawback that a dough is damaged upon mechanical treatment. In addition, bread obtained by baking up a dough after freezing or cold storage is accompanied with the drawback that it is inferior in a specific volume, internal phase, appearance and quality such as taste, particularly specific volume, to bread obtained by a conventional bread preparing process.

As a process for improving the quality of the bread obtained by baking up a dough after mechanical treatment or freezing or cold storage, known is a process of adding to the dough a dough improver, for example, an emulsifier such as glycerin fatty acid ester (JP-A-61-234733), an enzyme such as amylase or lypase (JP-9-135656), starch (JP-A-62-104536) or gluten (EP-B-134658).

Even if the above processes are used as, it is difficult to overcome the deterioration in the quality of bread as a result of the mechanical treatment or cold or frozen storage. Development of a dough improver for improving bread quality is therefore always desired. Also, in the ordinary bread preparing process, development of a dough improver for further improving the bread quality is desired.

SUMMARY OF THE INVENTION

An object of the present invention is to provide an emulsifier useful for preparing an emulsified composition having excellent emulsion stability.

Another object of the present invention is to provide a dough improver useful for preparing bread having excellent quality.

These and other objects of the present invention have been attained by a complex of a protein with a saponin or a bile acid, an emulsifier comprising said complex, an emulsified composition comprising said complex, a process for preparing an emulsified composition which comprises mixing said complex, a dough improver comprising said complex, a dough comprising said complex, bread prepared by baking up said dough and a process for preparing bread, which comprises baking up said dough.

DETAILED DESCRIPTION OF THE INVENTION

As proteins usable in the present invention, any one of natural protein materials having a high content of a plant protein or animal protein and crudely purified or purified proteins derived from the natural protein materials can be used as long as it can be used for foods, pharmaceuticals, cosmetics and toiletries, preferably for foods.

Examples of the plant protein include seed proteins (e.g. wheat protein, soybean protein, corn protein). Examples of the animal protein include milk proteins (e.g., whey protein, casein), egg proteins (e.g., albumen protein, yolk protein), blood proteins (e.g., plasma protein, blood cell protein) and muscle proteins (e.g., meat protein, fish meat protein).

The protein in the present invention may be a simple protein, a conjugated protein and a derived protein. The protein of the present invention may form a salt with an alkali metal, an alkaline earth metal or the like.

Examples of the simple protein include albumin, globulin, glutelin(s), prolamine(s), histone and protamine.

Examples of the conjugated protein include phosphoprotein (e.g., casein), heme protein (e.g., hemoglobin), lipoprotein (e.g., plasma lipoprotein), and glycoprotein (e.g., collagen, fibrinogen).

The derived protein is obtained by subjecting a natural protein to chemical treatment, enzymatic treatment or physical treatment for hydrolysis, acylation, alkylation, esterification, phosphorylation, glycosylation, hydroxylation, methylation, oxidation, reduction or the like. Examples thereof include gelatin, plakalbumin, metaprotein, proteose and peptone.

Preferred examples of the protein for use in the present invention include wheat protein, soybean protein, plasma protein, albumen protein, whey protein, casein and gelatin. Cold-water-soluble gelatin and casein sodium are preferably used as the gelatin and the casein, respectively.

Preferably, the saponin for use in the present invention is a glycoside contained in a plant and is selected from compounds containing steroid or terpenoid as a non-saccharide portion. Examples thereof include soybean saponin, beet saponin, spinach saponin, soapberry saponin, yucca saponin and Quillaja saponin. Among these, preferred are soybean saponin, yucca saponin and Quillaja saponin.

In the present invention, any bile acid can be used as long as it is an acid having a steroid skeleton contained in a bile of an animal. Examples thereof include cholic acid, dehydrocholic acid, deoxycholic acid, lithocholic acid, glycocholic acid, taurocholic acid, tauroglycocholic acid, taurochenodeoxycholic acid, taurodeoxycholic acid, glycochenodeoxycholic acid, glycodeoxycholic acid, glycolithocholic acid, chenodeoxycholic acid, taurolithocholic acid, ursodeoxycholic acid, 7-ketolithocholic acid and bile powder (a mixture of 67% cholic acid, 30% deoxycholic acid and 3% chenodeoxycholic acid). The bile acid of the present invention includes bile acid salts. Examples of the bile acid salt include metal salts of a bile acid, for example, alkali metal salts (e.g., sodium salt, potassium salt), alkaline earth metal salts (e.g., magnesium salt, calcium salt), and ammonium salts. Among these, alkali metal salts are preferred, with sodium salts being particularly preferred. Preferred bile acids for use in the present invention are bile powder and sodium choleate.

The complex of a protein with a saponin or a bile acid for use in the present invention means a material whose bound condition between a protein and a saponin or a bile acid can be maintained even if treated with water, acetone or chloroform but which separates into a protein and a saponin or a bile acid when treated with a chloroform-methanol mixed solvent (2:1 mixture by volume). The complex of the present invention may further contain an acceptable carrier.

The content of saponin or bile acid in the complex of the present invention is not particularly limited; however, it is preferably 2 to 50 wt %, more preferably 5 to 20 wt %.

A process for preparing the complex of the present invention is given below.

A protein aqueous solution is prepared by dissolving or dispersing the protein in an aqueous medium in an amount of 5 to 20 wt %, preferably 10 to 15 wt %. Separately, a saponin or bile acid is dissolved or dispersed in an aqueous medium in an amount of 0.2 to 10 wt %, preferably 0.5 to 3 wt %, to prepare a saponin or bile acid aqueous solution. It is preferred to stir the resulting aqueous solution in advance in a stirring mixer, such as a homogenizer or a homomixer, for about 1 to 5 minutes in order to improve the solubility or dispersibility of the saponin or bile acid in the aqueous medium. In addition, two aqueous solutions can be prepared depending on the bound ratio of the protein with the saponin or bile acid in the final product.

Also, it is preferred that the protein aqueous solution and the saponin or bile acid aqueous solution are separately prepared in advance and then mixed with each other. Alternatively, a protein and a saponin or bile acid can be simultaneously dissolved or dispersed in one aqueous medium and mixed with each other unless the solubility or dispersibility of the protein and saponin or bile acid is not impaired.

The term "taqueous medium" as used herein means water or a solvent mainly comprising water. The "solvent mainly comprising water" contains water as a main component and other components, such as an alcohol, a saccharide, an amino acid, a metal ion, an organic acid or an inorganic acid, within an extent not inhibiting the binding of a protein with a saponin or bile acid.

A mixed solution of the protein aqueous solution and the saponin or bile acid aqueous solution is stirred. At this time, in order to promote the binding of the protein with the saponin or bile acid, it is preferred to carry out vigorous stirring at 10 to 60° C., for example, at thousands to tens of thousands rpm, generally 3,000 to 25,000 rpm for about 1 to 30 minutes in a homogenizer or homomixer.

After the completion of stirring, the complex of the present invention is prepared as the aqueous solution or by removing a saponin or bile acid not bound with the protein and/or isolating the complex from the aqueous solution. The saponin or bile acid not bound with the protein can be removed from the aqueous solution by ultracentrifuging the aqueous solution or adding a protein precipitator such as a 4 to 6% trichloroacetic acid solution to precipitate and recover the complex as a precipitate, or by separating the saponin or bile acid remaining in the aqueous solution from the complex by filtration, dialysis or the like to recover only the complex.

The complex of the present invention is also prepared by the following process.

A saponin or bile acid is dissolved or dispersed in an aqueous medium in an amount of 5 to 50 wt %, preferably 30 to 50 wt %, to prepare a saponin or bile acid aqueous solution. The resulting aqueous solution is added to a protein to prepare a mixture having water generally in an amount of 10 to 50 wt %, preferably 25 to 35 wt %. The mixture is stirred at 20 to 70° C. for about 5 to 30 minutes and then the complex of the present invention is prepared.

Further, the complex of the present invention includes the complex prepared by the above processes and with drying treatment such as lyophilization, spray drying or stream drying.

The content amount of the saponin or bile acid in the complex prepared according to the above-described process can be measured, for example, by the following method. The saponin first extracted from the complex by acetone is called a free saponin, the bile acid extracted by acetone is called as a free bile acid, and the saponin and bile acid extracted by a chloroform-methanol mixed solvent (2:1 by volume) after extraction of a free saponin and a free bile acid are called a bound saponin and a bound bile acid, respectively.

The complex prepared in the above process is then concentrated under reduced pressure and the residue is dried at 60 to 70° C. into a predetermined weight. The weight of the dried complex so obtained is designated as a total complex amount. To the dried complex, 10 times the weight of acetone or chloroform are added, and extracted twice. The two extracted filtrates are combined and concentrated under reduced pressure. The residue is dried at 60 to 70° C. to be a constant weight and the weight of the dried material thus obtained is designated as a total extract amount. A certain amount of the above extracted filtrate is sampled and a protein amount thereof is calculated by the Lowry method or the like. The value obtained by subtracting the protein amount from the total extract amount is designated as a free saponin or bile acid amount. In a similar manner to the measuring method of the free saponin or bile acid amount except that a 2:1 (by volume) chloroform-methanol mixed solution is used as a solvent instead of chloroform, the total saponin or bile acid amount is measured.

The bound saponin or bile acid amount can be calculated in accordance with the following equation:

(bound saponin or bile acid amount)=(total saponin or bile acid amount)−(free saponin or bile acid amount)

The content of the saponin or bile acid in the complex of the present invention can be calculated in accordance with the following equation:

(content (wt%) of the saponin or bile acid in the complex of the present invention)=(bound saponin or bile acid amount)/((total complex amount)−(total extract amount))×100

By using as an emulsifier the complex of the present invention, an acidic emulsified composition containing generally about pH 3 to 4 and having excellent storage stability at room temperature and heating stability, an acidic emulsified composition containing a salt, for example, 10 mM calcium chloride ($CaCl_2$) or 0.5 M sodium chloride (NaCl) and having excellent storage stability at room temperature and heating stability, a neutral emulsified composition having generally about pH 7 and excellent storage stability at room temperature and heating stability, and a neutral emulsified composition containing a salt and having excellent storage stability at room temperature and heating stability can be prepared. By using the complex of the present invention as a food emulsifier, an emulsified composition having not only excellent emulsion stability but also little deterioration in the taste of food can be prepared.

As the emulsifier of the present invention, the complex of the present invention, preferably that after drying, may be used as it is or after added with other components, such as an emulsifier, an extender, a coloring agent, a perfume and/or an antiseptic, within an extent not impairing the function of the emulsifier. The emulsifier of the present invention may take any form such as powders, granules, a paste or an emulsion. The emulsifier according to the present invention may be used as any one of a food emulsifier, a pharmaceutical emulsifier, a cosmetic emulsifier, a toiletry emulsifier and the like, with a food emulsifier being preferred.

The emulsified composition of the present invention includes an oil-in-water (O/W) emulsified composition in which an oil is dispersed in water and a water-in-oil (W/O) emulsified composition in which water is dispersed in an oil as long as it contains the complex of the present invention. The oil-in-water emulsified composition is preferred. The emulsified composition of the present invention can be used, for example, as food emulsified compositions (e.g., mayonnaise, dressing, raw cream, potage soup, oil-containing seasoning); pharmaceutical emulsified compositions (e.g., urea cream, acne cream); cosmetic emulsified compositions (e.g., cream, milky lotion, foundation); and toiletry emulsified compositions (e.g., shampoo, rinse). Among these, it is used preferably as a food emulsified composition.

The content of the complex in the emulsified composition of the present invention is at least 0.1 wt %, preferably 0.1 to 20 wt %, and more preferably 0.5 to 5 wt %.

A process for preparing an emulsified composition of the present invention will be described below.

The emulsified composition can be prepared by emulsifying an aqueous phase and an oil phase through the conventional process except that the complex of the present invention is incorporated in the aqueous or oil phase, followed by mixing and stirring or the complex of the present invention is incorporated upon mixing and stirring the aqueous and oil phases. Although the complex of the present invention may be incorporated in either of the aqueous phase or oil phase, the incorporation in the aqueous phase is preferred. It is only necessary to incorporate the complex of the present invention in an amount so as to be the content of the complex in the emulsified composition of the present invention. For promoting emulsification, stirring is preferably conducted vigorously at 10 to 60° C., for example, thousands to tens of thousands rpm in a homogenizer or homomixer, generally at 3,000 to 25,000 rpm for about 1 to 30 minutes. In addition, it is preferred to carry out treatment in a ultrasonic homogenizer or the like to finely divide the particles in the emulsified composition.

As the dough improver according to the present invention, the complex of the present invention, preferably dried complex, may be used as it is. It is also possible to add to the complex of the present invention other components such as emulsifier, extender, coloring agent, perfume, antiseptic and the like within an extent not damaging the function as an emulsifier.

When the complex of the present invention is used as a dough improver, any protein can be used as a protein in the complex; however, wheat protein and gelatin are preferably used.

Examples of the wheat protein include glutenin which is a mixture of proteins belonging to glutelin, gliadin which is a mixture of proteins belonging to prolamine, and gluten which is a mixture of proteins comprising glutenin and gliadin as main components. Examples of the gluten which can be used include active gluten prepared without chemical or enzymatic treatment for wheat protein and modified gluten prepared by chemical or enzymatic treatment, such as alkali treatment, for wheat protein can be used. The active gluten is preferably used.

The gelatin for use in the present invention includes those obtained by hydrolyzing collagen contained in skin, bone or tendon of animals such as cattle and pig having a molecular weight of 5,000 to 300,000, and a jelly strength of at least 50 bloom, preferably 100 to 300 bloom.

The dough improver of the present invention may be any form such as powders, granules, a paste or an emulsion.

The dough improver of the present invention is added to raw materials for bread in an amount of 0.1 to 20 parts by weight, preferably 0.5 to 10 parts by weight, based on 100 parts by weight of the wheat in the raw materials for bread.

Examples of the raw materials for bread include principal raw materials (e.g., grain flour, yeast, table salt) and subsidiary raw materials (e.g., saccharide, dairy product, egg, oil and fat, improver, spice).

Examples of the grain flour include wheat flour, rye flour, rice flour and cornflour. Among these, wheat flour is preferably used.

As yeast, any yeast having a capacity of leavening a dough by fermentation, for example, yeast belonging to *Saccharomyces cerevisiae*, can be used.

Examples of the saccharides include sucrose, dextrose, fructose, maltose, granulated sugar, honey, molasses and thick malt syrup.

Examples of the dairy product include pure milk, powdered skim milk, pure powdered milk and condensed milk.

As an egg, any egg can be used but a hen's egg is ordinarily used.

Examples of the oil and fat include butter, margarine, lard, coconut oil, soybean oil, cottonseed oil and shortening.

Examples of the improver include yeast food, emulsifier and malt extract.

Examples of the spice include vanilla, cinnamon, nutmeg, ginger and pepper.

As a dough, any dough used for preparing bread can be used as long as it contains the complex of the present invention.

The dough of the present invention can be prepared by adding the complex of the present invention to raw materials for bread in an amount of 0.1 to 20 parts by weight, preferably 0.5 to 10 parts by weight, based on 100 parts by weight of grain flour in the raw materials, adding food additives if needed, and then mixing with water.

As the bread of the present invention, bread in any form such as white bread, bun, pastry bread, French bread, rye bread, croissant, butter roll, sweet roll, doughnut, bun stuffed with bean-jam, cake and cookie can be prepared; however, bread obtained by baking up after leavening the dough of the present invention is preferred.

Examples of the process for baking up the dough include a process for baking a dough in a dry air of at least about 180° C., a process for frying a dough in an oil of about 150 to 180° C. and a process of steaming a dough in the steam of about 100° C.

To leaven a dough, it is the common practice to fermenting the yeast contained in the dough. It is however possible to use in combination a process for adding to a dough a leavening agent such as baking powder or a process of forming a laminated layer by folding a dough layer and an oil layer alternately.

In the present invention, bread is prepared in the conventional method such as a sponge and dough method or straight method except for using the dough of the present invention.

A description will next be made of the conventional bread preparing process, for example, a 70% sponge and dough method, a sponge and dough method using an automatic encrusting machine, and a straight method using frozen dough.

(1) Preparation of bread by the 70% sponge and dough method

Sponge ingredients which mainly comprise wheat flour, yeast and yeast food, the dough improver of the present invention and water are mixed, and then fermented at 25 to 35° C. for about 240 minutes. The resulting sponge, remaining ingredients which mainly comprise wheat flour, sugar and shortening, and water are mixed, and then fermented at 25 to 35° C. for 15 to 30 minutes. The resulting dough is divided according to the size of the desired bread and rested at 15 to 35° C. for 10 to 30 minutes. The divided dough is shaped and put into a mold. The resulting dough is leavened at 30 to 45° C. (proofing) until to be a constant height, and then baked at 180 to 220° C. for 8 to 25 minutes.

(2) Preparation of bread by the sponge and dough method using the automatic encrusting machine Sponge ingredients which mainly comprise wheat flour, yeast and yeast food, the dough improver of the present invention and water are mixed, and then fermented at 25 to 35° C. for 100 to 150 minutes. The resulting sponge, remaining ingredients which mainly comprise wheat flour, sugar and shortening, and water are mixed, and then fermented at 25 to 35° C. for 40 to 120 minutes. The resulting dough is divided by using an encrusting machine (e.g., Rheon Type-207). The divided dough is rested at 15 at 35° C. for 10 to 30 minutes. Then the dough is shaped and put into a mold. The resulting dough is leavened at 30 to 45° C. (proofing) until to be a constant height, and then baked at 180 to 220° C. for 8 to 25 minutes.

(3) Preparation of bread by the straight method using frozen dough

Dough ingredients which mainly comprise wheat flour, yeast and yeast food, the dough improver of the present invention and water are mixed, and then fermented at 25 to 35° C. for 30 to 120 minutes. The resulting dough is divided according to the size of the desired bread and then frozen at −20 to −40° C. After the completion of the storage under freezing, the frozen dough is thawed at 25 to 35° C. The resulting dough is leavened at 30 to 45° C. (proofing) until to be a constant height, and then baked at 180 220° C. for 8 to 25 minutes.

The present invention provides an emulsifier useful for preparing an emulsified composition having excellent emulsion stability and a dough improver useful for preparing bread having excellent quality.

Examples, comparative examples and test examples will be described below; however, the present invention is not limited thereto.

EXAMPLE 1

A 9.5% aqueous solution of casein sodium (hereinafter referred to as "casein Na") ("Casein M", trade name; produced by Kyowa Hakko Kogyo Co., Ltd.) and a 0.5% aqueous solution of bile powder (produced by BIOCON JAPAN) were prepared, respectively. Those aqueous solutions, each 500 ml, were mixed. The resulting mixture was adjusted to pH 7, and then stirred at 25° C. and 8000 rpm for 10 minutes in a TK homomixer (produced by Tokushu Rikaki). After the completion of stirring, the reaction mixture was dialyzed using a cellulose tube in running water. After dialysis, the content in the cellulose tube was lyophilized to prepare a complex of casein Na with bile powder.

The content of the bile powder in the complex of casein Na with bile powder was calculated based on the following method.

To 500 mg of the complex of casein Na with bile powder, 50 ml of chloroform was added, and then extracted for 20 minutes while stirring at ordinary temperature. The extract was filtered through a Toyo Filter Paper No. 50 in vacuo. To the residue, 50 ml of chloroform was added, and the same operation was conducted again. Two extracted filtrates were combined and concentrated under reduced pressure. The residue was thereafter dried at 60 to 70° C. until it decreased to a constant weight. The dried substance was weighed, which was designated as a total extract amount. A certain amount of the extract filtrate was sampled and the casein Na amount thereof was calculated by the Lowry method. The value obtained by subtracting the casein Na amount from the total extract amount was designated as a free bile powder amount.

The total bile powder amount was measured in the same manner as the measuring method of the free bile powder amount except that a 2:1 (by volume) chloroform-methanol mixture was used as a solvent instead of chloroform.

The bound amount of bile powder was calculated in accordance with the above-described calculation formula for the bound amount of a bile acid, and the content of the bile powder in the complex was calculated in accordance with the above-described calculation formula for the content of a saponin or bile acid in the complex.

As a result, the content of the bile powder in the complex of casein Na with bile powder was 5%.

EXAMPLE 2

A complex of separated soybean protein with Quillaja saponin was prepared in the same manner as in Example 1 except that a 9.5% aqueous solution of separated soybean protein ("Promic P", trade name; produced by Kyowa Hakko Kogyo Co., Ltd.) and a 0.5% aqueous solution of Quillaja saponin were used instead of the 9.5% aqueous solution of casein Na and the 0.5% aqueous solution of bile powder, respectively.

The content of the Quillaja saponin in the complex of separated soybean protein with Quillaja saponin was calculated in the same manner as in Example 1 except that acetone was used instead of chloroform. The content was found to be 5%.

EXAMPLE 3

The complex of albumen protein of Quillaja saponin was prepared in the same manner as in Example 1 except that a 9.5% aqueous solution of albumen protein (Albumen; produced by Q.P. Corporation) and a 0.5% aqueous solution of Quillaja saponin were used instead of the 9.5% aqueous solution of casein Na and the 0.5% aqueous solution of bile powder, respectively.

The content of the Quillaja saponin in the complex of albumen protein with Quillaja saponin was calculated in the same manner as in Example 1 except that acetone was used instead of chloroform. The content was found to be 5%.

EXAMPLE 4

A complex of whey protein with Quillaja saponin was prepared in the same manner as in Example 1 except that a 9.5% aqueous solution of whey protein ("Lacprodan 80", trade name; produced by Denmark Protein Inc.) and a 0.5% aqueous solution of Quillaja saponin were used instead of the 9.5% aqueous solution of casein Na and the 0.5% aqueous solution of bile powder, respectively.

The content of the Quillaja saponin in the complex of whey protein with Quillaja saponin was calculated in the same manner as in Example 1 except that acetone was used instead of chloroform. The content was found to be 5%.

EXAMPLE 5

A complex of whey protein with cholic acid was prepared in the same manner as in Example 1 except that a 8% aqueous solution of whey protein and a 2% aqueous solution of sodium cholate (which will hereinafter be abbreviated as "Tcholic acid Na") were used instead of the 9.5% aqueous solution of casein Na and the 0.5% aqueous solution of bile powder, respectively.

The content of the cholic acid Na in the complex of whey protein with cholic acid Na was calculated in the same manner as in Example 1. The content was found to be 11%.

EXAMPLE 6

A complex of gelatin with bile powder was prepared in the same manner as in Example 1 except that cold-water-soluble gelatin ("Cold-water-soluble gelatin HK-30", trade name; produced by Kyowa Hakko Kogyo Co., Ltd.) was used instead of the 9.5% aqueous solution of casein Na.

The content of the bile powder in the complex of gelatin with bile powder was calculated in the same manner as in Example 1. The content was found to be 5%.

EXAMPLE 7

A complex of plasma protein with bile powder was prepared in the same manner as in Example 1 except that plasma protein ("Aspro GL", trade name; produced by Kyowa Hakko Kogyo Co., Ltd.) was used instead of the 9.5% aqueous solution of casein Na.

The content of the bile powder in the complex of plasma protein with bile powder was calculated in the same manner as in Example 1. The content was found to be 5%.

EXAMPLE 8

A complex gelatin with Quillaja saponin was prepared in the same manner as in Example 1 except that a 9.5% aqueous solution of cold-water-soluble gelatin and a 0.5% aqueous solution of Quillaja saponin were used instead of the 9.5% aqueous solution of casein Na and the 0.5% aqueous solution of bile powder, respectively.

The content of the Quillaja saponin in the complex gelatin with Quillaja saponin was calculated in the same manner as in Example 1 except that acetone was used instead of chloroform. The content was found to be 5%.

EXAMPLE 9

A complex of casein Na with cholic acid Na was prepared in the same manner as in Example 1 except that a 5% aqueous solution of casein Na and a 5% aqueous solution of cholic acid Na were used instead of the 9.5% aqueous solution of casein Na and a 0.5% aqueous solution of bile powder, respectively.

The content of the cholic acid Na in the complex of casein Na with cholic acid Na was calculated in the same manner as in Example 1. The content was found to be 19%.

EXAMPLE 10

A 9.5% aqueous solution of gluten ("Regular Gluten A", trade name; produced by Kyowa Hakko Kogyo Co., Ltd.) and a 0.5% aqueous solution of Quillaja saponin were prepared separately. Those two solutions, each 500 ml, were mixed. The resulting mixture was adjusted to pH 3, and then stirred at 25° C. and 8,000 rpm for 10 minutes in a TK homomixer. After the completion of stirring, the reaction mixture was adjusted to pH 7 and centrifuged at 3,000 ×g and 5° C. for 10 minutes. The precipitate thus obtained was lyophilized to prepare a complex of gluten with Quillaja saponin.

The content of the Quillaja saponin in the complex of gluten with Quillaja saponin was calculated in the same manner as in Example 1 except that acetone was used instead of chloroform. The content was found to be 5%.

EXAMPLE 11

A complex of gluten with bile powder was prepared in the same manner as in Example 10 except that a 0.5% aqueous solution of bile powder was used instead of the 0.5% aqueous solution of Quillaja saponin.

The content of the bile powder in the complex of gluten with bile powder was calculated in the same manner as in Example 1. The content was found to be 5%.

EXAMPLE 12

A complex of gliadin with yucca saponin was prepared in the same manner as in Example 10 except that a 9.5% aqueous solution of gliadin ("Glia A", trade name; produced by Asama Kasei) and a 0.5% aqueous solution of yucca saponin were used instead of the 9.5% aqueous solution of gluten and the 0.5% aqueous solution of Quillaja saponin, respectively.

The content of the yucca saponin in the complex of gliadin with yucca saponin was calculated in the same manner as in Example 1 except that acetone was used instead of chloroform. The content was found to be 5%.

EXAMPLE 13

A complex of glutenin with bile powder was prepared in the same manner as in Example 10 except that a 9.5% aqueous solution of glutenin ("Asama Glutenin", trade name; produced by Asama Kasei) and a 0.5% aqueous solution of bile powder were used instead of the 9.5% aqueous solution of gluten and the 0.5% aqueous solution of Quillaja saponin, respectively.

The content of the bile powder in the complex of glutenin with bile powder was calculated in the same manner as in Example 1. The content was found to be 5%.

EXAMPLE 14

A mayonnaise-like seasoning is prepared by using the following composition and preparation process.

| (Composition) | |
|---|---|
| Salad oil | 75% |
| Sucrose | 1% |
| Vinegar | 10% |
| Table salt | 1.4% |
| Western mustard | 0.4% |
| Pepper | 0.1% |
| Sodium glutamate (MSG) | 0.1% |
| Water | 7% |
| Complex of albumen protein with Quillaja saponin | 5% |

(Preparation process)

Sucrose, vinegar, table salt, western mustard, pepper, MSG, water and a complex of albumen protein with Quillaja saponin are mixed, and then a salad oil is added slowly while mixing and stirring to prepare a mayonnaise-like seasoning.

EXAMPLE 15

A coffee whitener is prepared in accordance with the following composition and preparation process.

| (Composition) | |
|---|---|
| Oil phase: | |
| Rape seed hardened oil | 25% |
| Aqueous phase: | |
| Sucrose fatty acid ester (HLB 16) | 1% |
| Skim milk powder | 2.5% |
| Complex of casein Na with bile powder | 2.5% |
| Water | 69% |

(Preparation process)

The oil phase and aqueous phase prepared according to the above composition are mixed, and then preliminary emulsification, high-pressure homogenization and sterilizing treatment are carried out in a conventional manner to prepare a coffee whitener.

Example 16

An oil-containing seasoning is prepared in accordance with the following composition and preparation process.

| (Composition) | |
|---|---|
| Oil phase: | |
| Chicken oil | 20% |
| Aqueous phase: | |
| Meat extract | 20% |
| Table salt | 5% |
| Water | 50% |
| Complex of gelatin with Quillaja saponin | 5% |

(Preparation process)

The oil phase and aqueous phase prepared according to the above composition are mixed, and then preliminary emulsification, high-pressure homogenization and sterilizing treatment are carried out in a conventional manner to prepare an oil-containing seasoning.

| Ingredients: | |
|---|---|
| (Sponge) | |
| Hard wheat flour | 70 parts by weight |
| Yeast | 2 parts by weight |
| Yeast food | 0.1 part by weight |
| (Dough) | |
| Hard wheat flour | 30 parts by weight |
| Sugar | 5 parts by weight |
| Table salt | 2 parts by weight |
| Skim milk powder | 2 parts by weight |
| Shortening | 5 parts by weight |

Process:
(Sponge)
Mixing (3 min. at low velocity, 1 min. at moderate high velocity)
Kneading temperature (24° C.)
Fermentation (240 minutes at 28° C.)
(Dough)
Mixing (3 min. at low velocity, 2 min. at moderate low velocity, 2 min. at low velocity, 3 min. at moderate low velocity and 3 min. at moderate high velocity)
Kneading temperature (28° C.)
Primary fermentation (20 minutes at room temperature)
Division (450 g)
Bench time (20 minutes at room temperature)
Shaping
Proofing (at 38° C. and 85% RH, 1.5 cm over shoulder)
Baking (25 min. at 220° C.)

To the above-described sponge ingredient, 2 parts by weight of the complex of gluten with bile powder obtained in Example 11 and 44 parts by weight of water were added, and then the fermentation was carried out in accordance with the above process. The fermented mixture was mixed with the above-described ingredients for final mixing. After adding 25 parts by weight of water, the resulting mixture was subjected to final mixing and baking in accordance with the above process to prepare a white bread.

EXAMPLE 18

A white bread was prepared in the same manner as in Example 17 except that 2 parts by weight of the complex of gluten with Quillaja saponin obtained in Example 10 were used instead of 2 parts by weight of the complex of gluten with bile powder.

EXAMPLE 19

A white bread was prepared in the same manner as in Example 17 except that 2 parts by weight of the complex gliadin with yucca saponin obtained in Example 12 were used instead of 2 parts by weight of the complex of gluten with bile powder.

EXAMPLE 20

A white bread was prepared in the same manner as in Example 17 except that 2 parts by weight of the complex of glutenin with bile powder obtained in Example 13 were used instead of 2 parts by weight of the complex of gluten with bile powder.

COMPARATIVE EXAMPLE 1

A white bread was prepared in the same manner as in Example 17 except that 2 parts by weight of gluten were used instead of 2 parts by weight of the complex of gluten with bile powder.

COMPARATIVE EXAMPLE 2

A white bread was prepared in the same manner as in Example 17 except that a simple mixture of 1.9 parts by weight of gluten and 0.1 part by weight of bile powder was used instead of 2 parts by weight of the complex of gluten with bile powder.

COMPARATIVE EXAMPLE 3

A white bread was prepared in the same manner as in Example 17 except that 42 parts by weight of water were used instead of 2 parts by weight of the complex of gluten with bile powder and 44 parts by weight of water.

COMPARATIVE EXAMPLE 4

A white bread was prepared in the same manner as in Example 17 except that 2 parts by weight of gliadin were used instead of 2 parts by weight of the complex of gluten with bile powder.

COMPARATIVE EXAMPLE 5

A white bread was prepared in the same manner as in Example 17 except that 2 parts by weight of glutenin were used instead of 2 parts by weight of the complex of gluten with bile powder.

EXAMPLE 21

| Ingredients: | |
| --- | --- |
| (Sponge) | |
| Hard wheat flour | 70 parts by weight |
| Yeast | 3.5 parts by weight |
| Yeast food | 0.2 part by weight |
| Whole egg | 7 parts by weight |
| Glucose | 5 parts by weight |
| (Dough) | |
| Hard wheat flour | 30 parts by weight |
| Granulated sugar | 20 parts by weight |
| Table salt | 0.8 part by weight |
| Skim milk powder | 2 parts by weight |
| Shortening | 8 parts by weight |
| Water | 11 parts by weight |

Bread preparing process:
(Sponge)
Mixing (3 min. at low velocity, 1 min. at moderate high velocity)
Kneading temperature (26° C.)
Fermentation (150 min at 28° C.)
(Dough)
Mixing (3 min. at low velocity, 2 min. at moderate low velocity, 2 min. at low velocity, 3 min. at moderate low velocity, 3 min. at moderate high velocity)
Kneading temperature (28° C.)
Primary fermentation (60 min. at room temperature)
Punching (90 sec.)
Filling of strained bean jam (150 parts by weight) [treated by an automatic encrusting machine ("Rheon 207 type", trade name; produced by Rheon Automatic Machinery)]
Division (50 g)
Proofing (50 min. at 38° C. and 85% RH)
Baking (8 min. at 200° C.)

To the above-described sponge ingredient, 2 parts by weight of the complex of gluten with bile powder obtained in Example 11 and 35 parts by weight of water are added and then the fermentation is carried out in accordance with the above process. The fermented material is mixed with the above-described ingredient for final mixing, and then 11 parts by weight of water are added. Following the above process, steps from final mixing to baking are carried out to prepare a bun.

EXAMPLE 22

A bun was prepared in the same manner as in Example 21 except that treatment by the automatic encrusting machine without filling strained bean jam and subsequent bench time (20 min. at room temperature), shaping and dividing were conducted instead of filling strained beam jam in portions by an automatic encrusting machine and subsequent dividing.

EXAMPLE 23

A bun was prepared in the same manner as in Example 22 except that 2 parts by weight of the complex of gluten with Quillaja saponin obtained in Example 10 were used instead of 2 parts by weight of the complex of gluten with bile powder.

COMPARATIVE EXAMPLE 6

A bun was prepared in the same manner as in Example 22 except that 2 parts by weight of gluten was used instead of 2 parts by weight of the complex of gluten with bile powder

COMPARATIVE EXAMPLE 7

A bun was prepared in the same manner as in Example 22 except that 33 parts by weight of water were used instead of 2 parts by weight of the complex of gluten with bile powder and 35 parts by weight of water.

EXAMPLE 24

| Ingredients: | |
| --- | --- |
| Hard white flour | 100 parts by weight |
| Yeast | 7 parts by weight |
| Yeast food | 0.15 part by weight |
| Granulated sugar | 25 parts by weight |
| Table salt | 0.8 part by weight |
| Skim milk powder | 3 parts by weight |
| Shortening | 6 parts by weight |
| Whole egg | 10 parts by weight |

Process:

Mixing (3 min. at low velocity, 2 min. at moderate low velocity, 2 min. at low velocity, 3 min. at moderate low velocity, 5 min. at moderate high velocity)

Kneading temperature (24° C.)

Primary leavening (30 min. at room temperature)

Division (50 g)

Bench time (20 min. at room temperature)

Shaping

Freezing (one month at −20° C.)

Thawing (40 min. at 30° C. and 65% RH)

Proofing (50 min. at 38° C. and 85% RH)

Baking (8 min. at 200° C.)

To the above-described ingredients, 2 parts by weight of the complex of gluten with bile powder obtained in Example 11, and 46 parts by weight of water were added, and a bun was prepared in accordance with the above-described process.

EXAMPLE 25

A bun was prepared in the same manner as in Example 24 except that 2 parts by weight of the complex of gluten with Quillaja saponin obtained in Example 10 were used instead of 2 parts by weight of the complex of gluten with bile powder.

EXAMPLE 26

A bun was prepared in the same manner as in Example 24 except that 2 parts by weight of the complex of gelatin with Quillaja saponin obtained in Example 8 were used instead of 2 parts by weight of the complex of gluten with bile powder.

COMPARATIVE EXAMPLE 8

A bun was prepared in the same manner as in Example 24 except that 2 parts by weight of gluten were used instead of 2 parts by weight of the complex of gluten with bile powder.

COMPARATIVE EXAMPLE 9

A bun was prepared in the same manner as in Example 24 except that 2 parts by weight of a cold water-soluble gelatin instead of 2 parts by weight of the complex of gluten with bile powder.

COMPARATIVE EXAMPLE 10

A bun was prepared in the same manner as in Example 24 except that 44 parts by weight of water were used instead of 2 parts by weight of the complex of gluten with bile powder and 46 parts by weight of water.

TEST EXAMPLE 1

An acidic aqueous solution (pH 3) containing 2 to 20 g/L of the complex of casein Na with bile powder obtained in Example 1 was prepared. To a 7.5 g portion of the aqueous solutions thus obtained, 7.5 g of a soybean salad oil were added, and then stirred at 30° C. and 20,500 rpm for 4 minutes in a high-speed stirrer ("ULTRA-TURRAX T-25", trade name; produced by IKA Corp.) to prepare an emulsified composition containing the complex of casein Na with bile powder.

An emulsified composition containing a mixture of casein Na and bile powder and an emulsified composition containing casein Na were prepared in the same manner as in the above process except that the mixture obtained by only mixing casein Na and bile powder each at the same amount as the complex thereof and casein Na were used instead of the complex of casein Na with bile powder, respectively. Casein Na was considered to have poor emulsion stability under acid conditions (at pH 3 to 4).

The emulsified compositions thus obtained were stored at 20° C. for 24 hours to evaluate their emulsion stability.

An amount of an emulsifier necessary for maintaining an emulsion stable ratio (ratio of an emulsified layer in the total volume) after storage at 70% was designated as ES70 (g/L), and an emulsion stable ratio after storage at the time when the concentration of the emulsifier was 10 g/L was designated as ESMax (%). These values were used as indexes for evaluation.

The results obtained are shown in Table 1.

TABLE 1

(pH 3, 20° C., 24 hrs)

| | Complex of casein Na with bile powder | Mixture of casein Na with bile powder | Casein Na |
| --- | --- | --- | --- |
| ES70 (g/L) | 3.9 | 8.3 | 10< |
| ESMax (%) | 92 | 80 | 56 |

As shown in Table 1, the emulsified composition containing the complex of casein Na with bile powder had more excellent emulsion stability upon storage under acid conditions than the emulsified composition containing casein Na or the mixture of casein Na with bile powder.

TEST EXAMPLE 2

An acidic aqueous solution (pH 3) containing 2 to 20 g/L of the complex of separated soybean protein with Quillaja saponin obtained in Example 2 was prepared. To a 7.5 g portion of the aqueous solution thus obtained, 7.5 g of a soybean salad oil were added, and then stirred at 30° C. and 20,500 rpm for 4 minutes in a high-speed stirrer to prepare an emulsified composition containing the complex of separated soybean protein with Quillaja saponin.

An emulsified composition containing separated soybean protein, an emulsified composition containing sucrose fatty acid ester, and an emulsified composition containing soybean lecithin were prepared in the same manner as in the above process except that separated soybean protein, sucrose fatty acid ester which was a commercially available product (HLB-16; produced by Mitsubishi Chemical), and soybean lecithin (SLP White; produced by Turu-Lecithin mfg. Co., Ltd.) were used instead of the complex of separated soybean protein with Quillaja saponin, respectively.

The emulsified compositions thus obtained were heated at 120° C. for 15 minutes, and the emulsion stability was evaluated in the same manner as in Test Example 1.

The results are shown in Table 2.

TABLE 2

(pH 3, 15 min at 120° C.)

| | Complex of separated soybean protein with Quillaja saponin | Separated soybean protein | Sucrose fatty acid ester | Soybean lecithin |
|---|---|---|---|---|
| ES70 (g/L) | 5.5 | aggregation | 10< | 10< |
| ESMax (%) | 86 | aggregation | 54 | 55 |

As shown in Table 2, the emulsified composition containing the complex of separated soybean protein with Quillaja saponin had emulsion stability after heating treatment under acidic conditions in which the emulsified composition containing separated soybean protein aggregated. The emulsified composition containing the complex of separated soybean protein with Quillaja saponin had more excellent emulsion stability after heating treatment than the emulsified composition containing sucrose fatty acid ester or soybean lecithin.

TEST EXAMPLE 3

A 10 mM $CaCl_2$ acidic aqueous solution (pH 3) containing 2 to 20 g/L of the complex of albumen protein with Quillaja saponin obtained in Example 3 was prepared. To a 7.5 g portion of the aqueous solution thus obtained, 7.5 g of a soybean salad oil was added, and then stirred at 30° C. and 20,500 rpm for 4 minutes in a high-speed stirrer to prepare an emulsified composition containing the complex of albumen protein with Quillaja saponin.

An emulsified composition containing albumen protein, an emulsified composition containing sucrose fatty acid ester, and an emulsified composition containing soybean lecithin were prepared in the same manner as in the above process except that albumen protein, sucrose fatty acid ester, and soybean lecithin were used instead of the complex of albumen protein with Quillaja saponin, respectively.

The emulsified compositions thus obtained were stored at 20° C. for 24 hours to evaluate the emulsion stability in the same manner as in Test Example 1.

The results are shown in Table 3.

TABLE 3

(10 mM $CaCl_2$, pH 3, 20° C., 24 hrs)

| | Complex of albumen protein with Quillaja saponin | Albumen protein | Sucrose fatty acid ester | Soybean lecithin |
|---|---|---|---|---|
| ES70 (g/L) | 1> | 2.1 | 5 | 10< |
| ESMax (%) | 100 | 94 | 75 | 55 |

As shown in Table 3, the emulsified composition containing the complex of albumen protein with Quillaja saponin had more excellent emulsion stability after storage in the presence of a salt and under acidic conditions than the emulsified composition containing albumen protein, sucrose fatty acid ester or soybean lecithin.

TEST EXAMPLE 4

A 10 mM $CaCl_2$ acid aqueous solution (pH 3) containing 2 to 20 g/L of the complex of whey protein with Quillaja saponin obtained in Example 4 was prepared. To a 7.5 g portion of the aqueous solution thus obtained, 7.5 g of a soybean salad oil was added, and then stirred at 30° C. and 20,500 rpm for 4 minutes in a high-speed stirrer to prepare an emulsified composition containing the complex of whey protein with Quillaja saponin.

As emulsified composition containing whey protein, an emulsified composition containing sucrose fatty acid ester, and an emulsified composition containing soybean lecithin were prepared in the same manner as in the above process except that whey protein, sucrose fatty acid ester, and soybean lecithin were used instead of the complex of whey protein with Quillaja saponin, respectively.

The emulsified compositions thus obtained were heated at 120° C. for 15 minutes to evaluate the emulsion stability in the same manner as in Test Example 1.

The results are shown in Table 4.

TABLE 4

(10 mM $CaCl_2$, pH 3, 120° C., 15 min)

| | Complex of whey protein with Quillaja saponin | Whey protein | sucrose fatty acid ester | Soybean lecithin |
|---|---|---|---|---|
| ES70 (g/L) | 5 | gelation | 10< | 10< |
| ESMax (%) | 90 | gelation | 54 | 50 |

As shown in Table 4, the emulsified composition containing the complex of whey protein with Quillaja saponin had emulsion stability after heating treatment in the presence of a salt and under acidic conditions in which the emulsified composition containing whey protein gelled. The emulsified composition containing the complex of whey protein with Quillaja saponin had more excellent emulsion stability after heating treatment than the emulsified composition containing sucrose fatty acid ester or soybean lecithin.

TEST EXAMPLE 5

A neutral aqueous solution (pH 7) containing 2 to 20 g/L of the complex of whey protein with cholic acid Na obtained in Example 5 was prepared. To a 7.5 g portion of the aqueous solution thus obtained, 7.5 g of a soybean salad oil was added, and then stirred at 30° C. and 20,500 rpm for 4 minutes in a high-speed stirrer to prepare an emulsified composition containing the complex of whey protein with cholic acid Na.

An emulsified composition containing whey protein, an emulsified composition containing sucrose fatty acid ester, and an emulsified composition containing soybean lecithin were prepared in the same manner as in the above process except that whey protein, sucrose fatty acid ester, and soybean lecithin were used instead of the complex of whey protein with colic acid Na, respectively.

The emulsified compositions thus obtained were stored at 20° C. for 24 hours to evaluate the emulsion stability in the same manner as in Test Example 1.

The results are shown in Table 5.

TABLE 5

(pH 7, 20° C., 24 hrs)

| | Complex of whey protein with cholic acid Na | Whey protein | Sucrose fatty acid ester | Soybean lecithin |
|---|---|---|---|---|
| ES70 (g/L) | 1.0 | 4.2 | 2.5 | 10< |
| ESMax (%) | 94 | 73 | 73 | 50 |

As shown in Table 5, the emulsified composition containing the complex of whey protein with cholic acid Na had more excellent emulsion stability after stored under neutral conditions than the emulsified composition containing whey protein, sucrose fatty acid ester or soybean lecithin.

TEST EXAMPLE 6

A neutral aqueous solution (pH 7) containing 2 to 20 g/L of the complex of gelatin with bile powder obtained in Example 6 was prepared. To a 7.5 g portion of the aqueous solutions thus obtained, 7.5 g of a soybean salad oil was added, and then stirred at 30° C. and 20,500 rpm for 4 minutes in a high-speed stirrer to prepare an emulsified composition containing the complex of gelatin with bile powder.

An emulsified composition containing gelatin, an emulsified composition containing sucrose fatty acid ester, and an emulsified composition containing soybean lecithin were prepared in the same manner as in the above process except that gelatin, sucrose fatty acid ester, and soybean lecithin were used instead of the complex of gelatin with bile powder, respectively.

The emulsified compositions thus obtained were heated at 120° C. for 15 minutes to evaluate the emulsion stability in the same manner as in Test Example 1.

The results are shown in Table 6.

TABLE 6

(pH 7, 120° C., 15 min)

| | Complex of gelatin with bile powder | Gelatin | Sucrose fatty acid ester | Soybean lecithin |
|---|---|---|---|---|
| ES70 (g/L) | 1.8 | 3 | 4 | 10< |
| ESMax (%) | 100 | 100 | 79 | 50 |

As shown in Table 6, the emulsified composition containing the complex of gelatin with bile powder had more excellent emulsion stability after heating treatment under neutral conditions than the emulsified composition containing gelatin, sucrose fatty acid ester or soybean lecithin.

TEST EXAMPLE 7

A 10 mM $CaCl_2$ neutral aqueous solutions (pH 7) containing 2 to 20 g/L of the complex of plasma protein with bile powder obtained in Example 7 was prepared. To a 7.5 g portion of the aqueous solutions thus obtained, 7.5 g of a soybean salad oil was added, and then stirred at 30° C. and 20,500 rpm for 4 minutes in a high-speed stirrer to prepare an emulsified composition containing the complex of plasma protein with bile powder.

An emulsified composition containing plasma protein, an emulsified composition containing sucrose fatty acid ester, and an emulsified composition containing soybean lecithin were prepared in the same manner as in the above process except that plasma protein, sucrose fatty acid ester, and soybean lecithin were used instead of the complex of plasma protein with bile powder, respectively.

The emulsified compositions thus obtained were stored at 20° C. for 24 hours to evaluate the emulsion stability in the same manner as in Test Example 1.

The results are shown in Table 7.

TABLE 7

(10 mM $CaCl_2$, pH 7, 20° C., 24 hrs)

| | Complex of plasma protein with bile powder | Plasma protein | Sucrose fatty acid ester | Soybean lecithin |
|---|---|---|---|---|
| ES70 (g/L) | 1> | 5 | 4.1 | 10< |
| ESMax (%) | 87 | 75 | 73 | 54 |

As shown in Table 7, the emulsified composition containing the complex of plasma protein with bile powder had more excellent emulsion stability after stored in the presence of a salt and under neutral conditions than the emulsified composition containing plasma protein, sucrose fatty acid ester or soybean lecithin.

TEST EXAMPLE 8

A 10 mM $CaCl_2$ neutral aqueous solution (pH 7) containing 2 to 20 g/L of the complex of gelatin with Quillaja saponin obtained in Example 8 was prepared. To a 7.5 g portion of the aqueous solution thus obtained, 7.5 g of a soybean salad oil was added, and then stirred at 30° C. and 20,500 rpm for 4 minutes in a high-speed stirrer to prepare an emulsified composition containing the complex of gelatin with Quillaja saponin.

An emulsified composition containing gelatin, an emulsified composition containing sucrose fatty acid ester, and an emulsified composition containing soybean lecithin were prepared in the same manner as in the above process except that gelatin, sucrose fatty acid ester, and soybean lecithin were used instead of the complex of gelatin with Quillaja saponin, respectively.

The emulsified compositions thus obtained were heated at 120° C. for 15 minutes to evaluate the emulsion stability in the same manner as in Test Example 1.

The results are shown in Table 8.

TABLE 8

(10 mM $CaCl_2$, pH 7, 120° C., 15 min)

| | Complex of gelatin with Quillaja saponin | Gelatin | Sucrose fatty acid ester | Soybean lecithin |
|---|---|---|---|---|
| ES70 (g/L) | 5 | 10< | 4.5 | 10< |
| ESMax (%) | 100 | 65 | 73 | 50 |

As shown in Table 8, the emulsified composition containing the complex of gelatin with Quillaja saponin had more excellent emulsion stability after heating treatment in the presence of a salt and under neutral conditions than the emulsified composition containing gelatin, sucrose fatty acid ester or soybean lecithin.

TEST EXAMPLE 9

An acidic aqueous solution (pH 3) containing 2 to 20 g/L of the complex of casein Na with cholic acid Na obtained in Example 9 was prepared. To a 7.5 g portion of the aqueous solution thus obtained, 7.5 g of a soybean salad oil was added, and then stirred at 30° C. and 20,500 rpm for 4 minutes in a high-speed stirrer to prepare an emulsified composition containing the complex of casein Na with cholic acid Na.

An emulsified composition containing casein Na, an emulsified composition containing sucrose fatty acid ester, and an emulsified composition containing soybean lecithin were prepared in the same manner as in the above process except that casein Na, sucrose fatty acid ester, and soybean lecithin were used instead of the complex of casein Na with colic acid Na, respectively.

The emulsified compositions thus obtained were stored at 20° C. for 24 hours to evaluate the emulsion stability.

The results are shown in Table 9.

TABLE 9

(pH 3, 20° C., 24 hrs)

| | Complex of casein Na with cholic acid Na | Casein Na | Sucrose fatty acid ester | Soybean lecithin |
|---|---|---|---|---|
| ES70 (g/L) | 4.5 | 10< | 5 | 10< |
| ESMax (%) | 75 | 56 | 75 | 53 |

As shown in Table 9, the emulsified composition containing the complex of casein Na with cholic acid Na had more excellent emulsion stability after stored under acidic conditions than the emulsified composition containing casein Na or soybean lecithin.

TEST EXAMPLE 10

A neutral aqueous solutions (pH 7) containing 2 to 20 g/L of the complex of gluten with Quillaja saponin obtained in Example 10 was prepared. To a 7.5 g portion of the aqueous solution thus obtained, 7.5 g of a soybean salad oil was added, and then stirred at 30° C. and 20,500 rpm for 4 minutes in a high-speed stirrer to prepare an emulsified composition containing the complex of gluten with Quillaja saponin.

An emulsified composition containing gluten, an emulsified composition containing sucrose fatty acid ester, and an emulsified composition containing soybean lecithin were prepared in the same manner as in the above process except that gluten, sucrose fatty acid ester, and soybean lecithin were used instead of the complex of gluten with Quillaja saponin, respectively.

The emulsified compositions thus obtained were stored at 20° C. for 24 hours to evaluate the emulsion stability in the same manner as in Test Example 1.

The results are shown in Table 10.

TABLE 10

(pH 7, 20° C., 24 hrs)

| | Complex of gluten with Quillaja saponin | Gluten | Sucrose fatty acid ester | Soybean lecithin |
|---|---|---|---|---|
| ES70 (g/L) | 1.9 | 10< | 2.5 | 10< |
| ESMax (%) | 89 | 55 | 73 | 50 |

As shown in Table 10, the emulsified composition containing the complex of gluten with Quillaja saponin had more excellent emulsion stability after stored under neutral conditions than the emulsified composition containing gluten, sucrose fatty acid ester or soybean lecithin.

TEST EXAMPLE 11

The specific volume of each of the white breads obtained in Example 17 and Comparative Examples 1 to 3 was measured by the rape seed substitution method.

The results are shown in Table 11.

TABLE 11

| | Complex of gluten with bile powder (Ex. 17) | Gluten (Comp. Ex. 1) | Mixtuxe of gluten with bile powder (Comp. Ex. 2) | Addition free (Comp. Ex. 3) |
|---|---|---|---|---|
| Specific volume (ml/g) | 5.59 | 5.18 | 5.18 | 5.03 |

As shown in Table 11, the white bread prepared using the dough containing the complex of gluten with bile powder had more excellent specific volume than that prepared using the dough containing gluten or the mixture of gluten with bile powder. Also, the white bread prepared using the dough containing the complex of gluten with bile powder had an excellent internal phase.

TEST EXAMPLE 12

The specific volume of each of the white breads obtained in Examples 18 to 20 and Comparative Examples 1, 4 and 5 was measured by the rape seed substitution method.

The results are shown in Table 12.

TABLE 12

| | Complex of gluten with Quillaja saponin (Ex. 18) | Complex of gliadin with yucca saponin (Ex. 19) | Complex of glutenin with bile powder (Ex. 20) | Gluten (Comp. Ex. 1) | Gliadin (Comp. Ex. 4) | Glutenin (Comp. Ex. 5) |
|---|---|---|---|---|---|---|
| Specific volume (ml/g) | 5.77 | 5.42 | 5.60 | 5.18 | 5.27 | 5.41 |

As shown in Table 12, the white bread prepared using the dough containing the complex of gluten with Quillaja saponin, that prepared using the dough containing the complex of gliadin with yucca saponin and that prepared using the dough containing the complex of glutenin with bile powder had a more excellent specific volume than that prepared using the dough containing gluten, that prepared using the dough containing gliadin and that prepared using the dough containing glutenin, respectively. Also, the white bread prepared using the dough containing the complex of gluten with Quillaja saponin, that prepared using the dough containing the complex of gliadin with yucca saponin and that prepared using the dough containing the complex of glutenin with bile powder each had an excellent internal phase.

TEST EXAMPLE 13

The specific volume of each of the buns obtained in Examples 22 and 23 and Comparative Examples 6 and 7 was measured by the rape seed substitution method.

The results are shown in Table 13.

TABLE 13

|  | Complex of gluten with bile powder (Ex. 22) | Complex of gluten with Quillaja saponin (Ex. 23) | Gluten (Comp. Ex. 6) | Free addition (Comp. Ex. 7) |
|---|---|---|---|---|
| Specific volume (ml/g) | 6.09 | 5.85 | 5.70 | 5.52 |

As shown in Table 13, the bun prepared using the dough containing the complex of gluten with bile powder and that prepared using the dough containing the complex of gluten with Quillaja saponin had a more excellent specific volume than the bun prepared using the dough containing gluten. Also buns prepared using the dough containing the complex of gluten with bile powder and the complex of gluten with Quillaja saponin had excellent internal phase and appearance.

TEST EXAMPLE 14

The specific volume of each of the buns obtained in Examples 24 to 26 and Comparative Examples 8 to 10 was measured by the rape seed substitution method.

The results are shown in Table 14.

TABLE 14

|  | Complex of gluten with bile powder (Ex. 24) | Complex of gluten with Quillaja saponin (Ex. 25) | Complex of gelatin with Quillaja saponin (Ex. 26) | Gluten (Comp. Ex. 8) | Gelatin (Comp. Ex. 9) | Free addition (Comp. Ex. 10) |
|---|---|---|---|---|---|---|
| Specific volume (m/g) | 7.83 | 7.58 | 7.76 | 6.90 | 7.30 | 6.85 |

As shown in Table 14, the bun prepared using the dough containing the complex of gluten with bile powder and that prepared using the dough containing the complex of gluten with Quillaja saponin had a more excellent specific volume than that prepared using the dough containing gluten; and the bun prepared using the dough containing the complex of gelatin with Quillaja saponin had a more excellent specific volume than that prepared using the dough containing gelatin. The bun prepared using the dough containing the complex of gluten with bile powder, that prepared using the dough containing the complex of gluten with Quillaja saponin and that prepared using the dough containing the complex of gelatin with Quillaja saponin had an excellent internal phase.

While the invention has been described in detail and with reference to specific embodiments thereof, it will be apparent to one skilled in the art that various changes and modifications can be made therein without departing from the spirit and scope thereof.

What is claimed is:

1. An emulsified composition comprising water, oil and a complex of a protein with a saponin or a bile acid.

2. The emulsified composition according to claim 1, wherein said complex comprises at least one protein selected from the group consisting of wheat protein, soybean protein, casein and gelatin.

3. The emulsified composition according to either of claims 2 or 1, wherein said complex contains the saponin or bile acid in an amount of 2 to 50 wt %.

4. A process for preparing an emulsified composition, which comprises mixing a composition having an aqueous phase and an oil phase with a complex of a protein with a saponin or a bile acid.

5. A dough composition comprising a bread dough and a complex of a protein with a saponin or a bile acid.

6. The dough composition according to claim 5, wherein said complex comprises at least one protein selected from the group consisting of wheat protein, soybean, protein, casein and gelatin.

7. Bread prepared by baking the dough composition according to either of claims 5 or 6.

8. A process for preparing bread, which comprises baking the dough composition according to either of claims 5 or 6.

9. A process for emulsifying a composition having an aqueous phase and an oil phase, comprising mixing the composition with a complex of a protein with a saponin or a bile acid.

10. A process for improving a bread dough, comprising adding to the bread dough a complex of a protein with a saponin or a bile acid.

11. The process according to any one of claims 4, 9 or 10, wherein said complex comprises at least one protein selected from the group consisting of wheat protein, soybean protein, casein and gelatin.

12. The process according to claim 11, wherein said complex contains the saponin or bile acid in an amount of 2 to 50 wt %.

13. The process according to any one of claims 4, 9 or 10, wherein said complex contains the saponin or bile acid in an amount of 2 to 50 wt %.

14. The dough composition according to either of claims 5 or 6, wherein said complex contains the saponin or bile acid in an amount of 2 to 50 wt %.

15. Bread prepared by baking the dough composition according to claim 14.

16. A process for preparing bread, which comprises baking the dough composition according to claim 14.

* * * * *

UNITED STATES PATENT AND TRADEMARK OFFICE
CERTIFICATE OF CORRECTION

PATENT NO.   : 6,066,352
DATED        : May 23, 2000
INVENTOR(S)  : MASASHI OGASAWARA ET AL.

It is certified that error appears in the above-identified patent and that said Letters Patent is hereby corrected as shown below:

COLUMN 1:

Line 39, "emulsifier" should read --an emulsifier--.

COLUMN 2:

Line 3, "as" should be deleted.

COLUMN 4:

Line 36, "as" should be deleted.

COLUMN 6:

Line 2, "a" should read --an--.

COLUMN 7:

Line 13, "ferment-" should read --ferment--;
    Line 14, "ing" should be deleted; and
    Line 66, "180 220° C." should read --180 to 220°C.--.

COLUMN 9:

Line 36, "Tcholic" should read --cholic"--.

COLUMN 11:

Line 64, "Example 16" should read --EXAMPLE 16--.

UNITED STATES PATENT AND TRADEMARK OFFICE
CERTIFICATE OF CORRECTION

PATENT NO. : 6,066,352
DATED : May 23, 2000
INVENTOR(S) : MASASHI OGASAWARA ET AL.

It is certified that error appears in the above-identified patent and that said Letters Patent is hereby corrected as shown below:

COLUMN 12:

Line 18, "seasoning." should read --seasoning.
        ¶ EXAMPLE 17--.

COLUMN 15:

Line 56, "instead" should read --were used instead--.

COLUMN 18:

Line 62, "colic" should read --cholic--.

COLUMN 19:

Line 23, "solutions" should read --solution--; and
    Line 57, "solutions" should read --solution--.

COLUMN 21:

Line 13, "colic" should read --cholic--; and
    Line 35, "solutions" should read --solution--.

UNITED STATES PATENT AND TRADEMARK OFFICE
CERTIFICATE OF CORRECTION

PATENT NO. : 6,066,352
DATED : May 23, 2000
INVENTOR(S) : MASASHI OGASAWARA ET AL.

It is certified that error appears in the above-identified patent and that said Letters Patent is hereby corrected as shown below:

<u>COLUMN 24</u>:

Line 12, "claims 2 or 1," should read --claims 1 or 2,--; and
Line 23, "soybean, protein," should read --soybean protein,--.

Signed and Sealed this

Twenty-fourth Day of April, 2001

Attest:

NICHOLAS P. GODICI

Attesting Officer    Acting Director of the United States Patent and Trademark Office